(12) United States Patent
Pogde (10) Patent No.: US 8,234,317 B1
(45) Date of Patent: Jul. 31, 2012

(54) AUTO-COMMITTING FILES TO IMMUTABLE STATUS BASED ON A CHANGE LOG OF FILE SYSTEM ACTIVITY

(75) Inventor: Prashant Pogde, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 595 days.

(21) Appl. No.: 12/186,935

(22) Filed: Aug. 6, 2008

(51) Int. Cl.
*G06F 17/30* (2006.01)
*G06F 12/00* (2006.01)
*G06F 7/00* (2006.01)
*G06F 17/00* (2006.01)

(52) U.S. Cl. .......................... 707/821; 707/823; 707/648

(58) Field of Classification Search .................. 707/821, 707/823, 648
See application file for complete search history.

(56) References Cited

U.S. PATENT DOCUMENTS

2007/0078890 A1\* 4/2007 Hsu et al. .................. 707/103 R
2009/0228511 A1\* 9/2009 Atkin et al. .................. 707/102

\* cited by examiner

*Primary Examiner* — Ann Chempakaseril
(74) *Attorney, Agent, or Firm* — Stattler-Suh PC (57) ABSTRACT

A system and method are provided for auto-committing files of a storage system to immutable status based on a change log of file system activity. The system is configured for producing and analyzing the change log. Producing the change log involves generating change log entries associated with changes made to files of the storage system and organizing the change log entries from the oldest to newest entries. Analyzing the change log involves processing the change log beginning with the oldest entry to determine whether any entries have met the auto-commit time period, and if so, to set the files associated with such entries to immutable status. If a change log entry is found not to have met the auto-commit time period, a resting time period is determined based on the oldest change log entry, and processing of the change log proceeds after expiration of the resting time period.

25 Claims, 6 Drawing Sheets

AUTO-COMMITTING FILES TO IMMUTABLE STATUS BASED ON A CHANGE LOG OF FILE SYSTEM ACTIVITY

FIELD OF THE INVENTION

The present invention relates to storage systems, and particularly, to auto-committing files in a storage system to immutable status.

BACKGROUND OF THE INVENTION

A storage system is a processing system adapted to store and retrieve information/data on storage devices (such as disks). The storage system includes a storage operating system that implements a file system to organize logically the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system may also be implemented as an application program operating over a general-purpose operating system, such as UNIX® or Windows®, or as a general-purpose operating system with configurable functionality, which is configured for storage applications as described herein.

A storage system is typically implemented as one or more storage volumes that comprise physical storage devices, defining an overall logical arrangement of storage space. Available storage system implementations may serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared LAN (local area network), WAN (wide area network), or VPN (virtual private network) implemented over a public network such as the Internet. The application executing on the server system may send an access request (read or write request) to the storage system for accessing particular data stored on the storage system.

In compliance environments, a mechanism may be used to commit files to "immutable" status on a rewritable storage media after the files have been written and have not been modified for a predetermined period of time (referred to as the "auto-commit time period"). A compliance environment may comprise a storage system configured to meet a set of legal or corporate requirements (e.g., a requirement that records are to be kept for a certain period of time or are auto-committed to immutable status after the predetermined period of time). Immutable status may comprise a storage setting that provides the file with all protections of a file that was written on a non-rewritable media. In other words, immutable status may indicate that the file is irreversibly read only and can not be changed/modified (where attributes of the file may or may not be modifiable). Placing files in immutable status is useful, for example, in financial environments where documents may be required (by legal or corporate requirements) to be made unchangeable and secure for auditing.

There are various ways to commit files to immutable status on rewritable storage systems. Data ONTAP® is an example of a system that may be configured to commit files to immutable status. Conventional mechanisms to commit files to immutable status on such rewritable platforms include usage of APIs (Application Program Interfaces), Protocols like NFS/CIFS (network file system/common Internet file system) and auto-commit. In one example of a conventional mechanism, an administrator may use an API to manually designate individual files to be made immutable. Those designated files are then made immutable immediately by the storage system. In another example of a conventional mechanism, "auto-commit" is a feature exported by Data ONTAP®, where administrators may setup an auto-commit time period on the storage system. The administrator may apply the auto-commit feature to a particular set of files on the storage system (e.g., all files within a volume, all files within a directory, etc.). If the files are not modified within the auto-commit time period, they are automatically committed to WORM (Write Once Read Many) status (i.e., immutable status) by the storage system itself without any user intervention. This feature provides a way for customers to commit automatically their data to immutable status in a regulatory compliance environment without making any changes to their application or deployment environment.

One challenge in implementing the auto-commit feature is determining when the files have met their auto-commit requirement, in other words, when the "auto-commit time period" has elapsed since the file was last modified. Data ONTAP® typically implements this auto-commit feature using system scanners. These scanners are threads or processes in the storage system that run in the background continuously, scanning each inode of the entire file system repeatedly to discover files that have met their auto-commit requirement. File system inodes are data structures that contain information about files that are created when a file system creates the files. Each file has an associated inode that is identified by an inode number (i-number) in the file system. These inodes provide important information on files, such as user and group ownership, access mode (read, write, execute permissions) and type. After scanning inodes and discovering files that have met their auto-commit requirement, scanners commit these files to immutable status.

Use of the system scanners in implementing the auto-commit feature, however, is time and resource intensive since the system scanners constantly process files. As such, there is a need for an improved method for implementing the auto-commit feature that is not as time and resource intensive.

SUMMARY

Some embodiments described below meet these needs by providing a system and method for auto-committing files of a storage system to immutable status based on a change log of file system activity. The change log of file system activity may indicate requested modifications to the files stored on the storage system and is referred to as the "change log." Some embodiments provide an automated method for determining whether files have met their auto-commit time period and changing such files to immutable status, without human initiation or intervention. In some embodiments, an auto-commit module residing in the storage operating system may work in conjunction with other software layers of the storage operating system to assist in auto-committing files to immutable status. The auto-commit module is configured for producing and analyzing the change log of file system activity. It should be appreciated that the embodiments can be implemented in numerous ways, including as a method, a process, an apparatus, a system or a device.

In some embodiments, the auto-commit module creates the change log by receiving write requests to change data associated with files of the storage system. For each received write request, the auto-commit module generates a change log entry (that represents the change to a specified file) and stores the change log entry in the change log. When producing a change log entry for a specified file, the auto-commit module may associate a timestamp with the change log entry. The timestamp may reflect the time of a predetermined event that relates to the modification of a file. For example, the timestamp may reflect the time that the write request was received, the time that the specified file was modified by the write request, or the time that the change log entry was produced. In some embodiments, the timestamp may comprise an inode timestamp. The auto-commit module may organize the change log entries for the various files from the oldest change log entry (having the oldest associated timestamp) to the newest change log entry (having the newest associated timestamp), e.g., by storing the oldest change log entry at the beginning of the change log and the newest change log entry at the end of the change log.

In some embodiments, the auto-commit module stores only one change log entry (the most recent change log entry) for each file in the change log. In these embodiments, when a new change log entry for a particular file is generated, the auto-commit module may delete any prior change log entry for the particular file from the change log and store the new change log entry at the end of the change log (since the new change log entry is the newest change log entry among the various files). As such, as the auto-commit module continues to receive write requests and generate change log entries for various files, the auto-commit module also continues to manage and re-organize the change log to produce an ordering from the oldest change log entry to the newest change log entry for the various files, whereby only one change log entry is stored for each file.

While the auto-commit module continues to manage and re-organize the change log, the auto-commit module also analyzes the change log to determine whether a file has met its auto-commit requirement (i.e., for the duration of the auto-commit time period, the file has not been modified). The auto-commit module may do so by implementing an auto-commit thread. In the some embodiments, the auto-commit thread analyzes the change log beginning with the oldest change log entry to the newest change log entry to determine the time when a change log entry was generated and whether the auto-commit time period has elapsed since that time. If so, the auto-commit thread may invoke a WORM module for any file that has met the auto-commit requirement. The WORM module sets those files to immutable status, and the auto-commit thread then removes the change log entries associated with those files from the change log.

In the some embodiments, once the auto-commit thread determines that a change log entry in the change log has not met the auto-commit time period, the auto-commit thread stops analyzing the change log entries in the change log and rests for a determined resting time period. Since, as described above, the change log is ordered from the oldest change log entry to the newest change log entry, if an older change log entry in the change log has not yet met the auto-commit time period, it follows that the remaining newer change log entries in the change log also have not met the auto-commit time period. As such, processing of the remaining newer change log entries by the auto-commit thread is not needed and would unnecessarily expend system resources. After the determined resting time period expires, the auto-commit module may invoke/activate the auto-commit thread (which, in some embodiments, may include a process or any executable entity) to again begin processing the change log entries in the change log. In some embodiments, the resting time period is determined using the auto-commit time period and the time the oldest change log entry in the change log was generated.

Some embodiments are advantageous in that they provide efficient use of the auto-commit thread which only processes change log entries in the change log until it processes a change log entry that has not met the auto-commit time period, at which point the auto-commit thread rests. As such, unnecessary processing of files in the file system may be avoided. Further, the system is scalable because this approach is not impacted when the size of the file system or the volume grows. The system may also give better time guarantee for auto-committing files to immutable status as the system works well even for a relatively small auto-commit time period.

BRIEF DESCRIPTION OF THE DRAWINGS

The novel features are set forth in the appended claims. However, for purpose of explanation, several embodiments of the invention are set forth in the following figures:

DETAILED DESCRIPTION

A system and method are provided for auto-committing files to immutable status based on a change log of file system activity. Some embodiments provide an automated method for determining whether files have met their auto-commit time period and changing such files to immutable status, without human initiation or intervention. In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections. Section I describes a storage system environment in which some embodiments operate. Section II describes components for auto-committing files to immutable status based on the change log of file system activity. Section III describes methods for auto-committing files to immutable status based on the change of file system activity. Section IV describes a computer readable medium implementation of a method for auto-committing files to immutable status based on the change log of file system activity.

I. Storage System Environment

Figure 1:
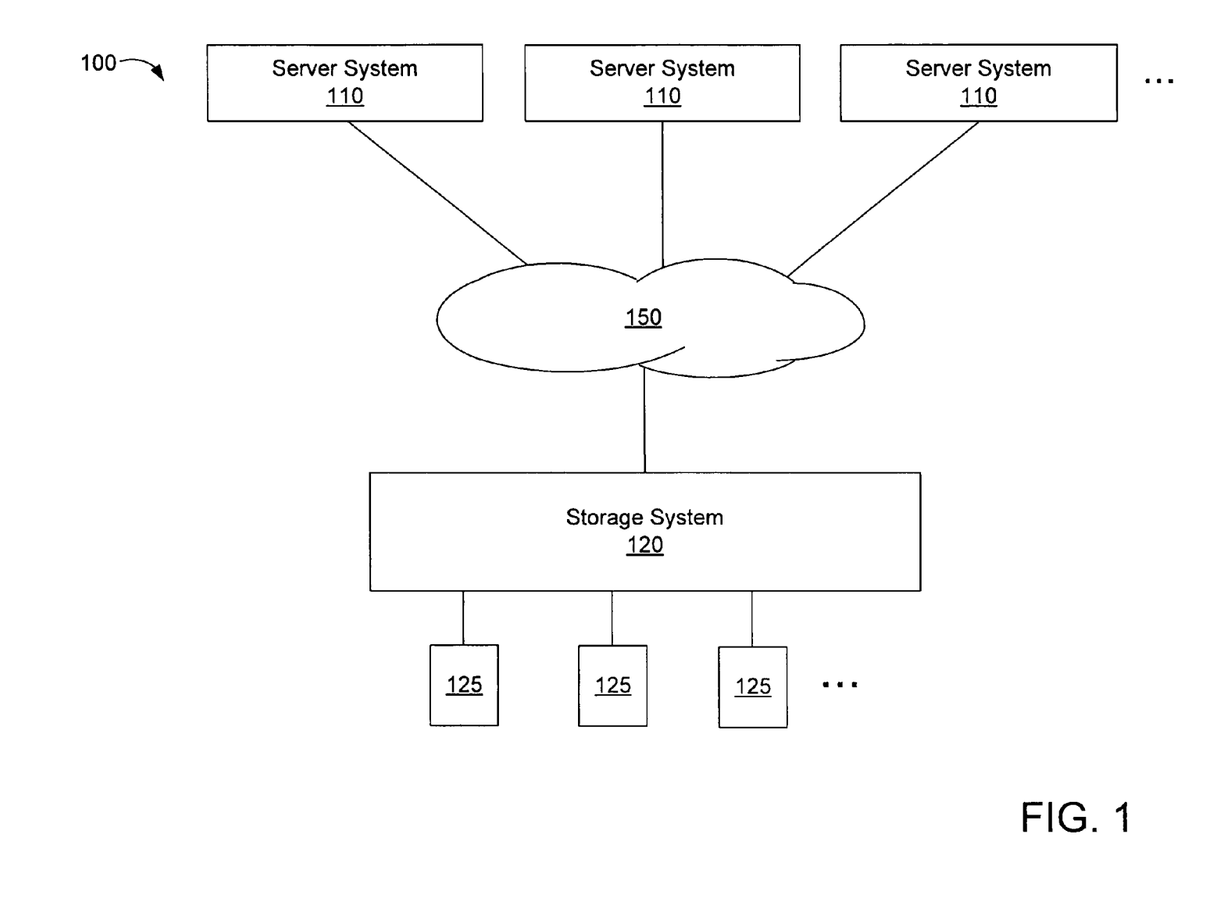
FIG. 1 is a schematic block diagram of an exemplary storage system environment in which some embodiments operate.

FIG. 1 is a schematic block diagram of an exemplary storage system environment 100 in which some embodiments operate. The environment 100 comprises one or more server systems 110 and a storage system 120 (comprising a set of one or more storage devices 125) that are connected via a connection system 150. The connection system 150 may comprise a network, such as a LAN (local area network), WAN (wide area network), MAN (metropolitan area network), the Internet, or any other type of network or communication system between computer systems.

A server system 110 may comprise a computer system that utilizes services of the storage system 120 to store and manage data in the storage devices 125 of the storage system 120. In general, a server system 110 may comprise any variety of computer devices that may utilize services of the storage system 120 (e.g., server computer, personal computer, laptop, handheld computer, personal digital assistant (PDA), etc.). A server system 110 may execute one or more applications that submit read/write requests for reading/writing data on the storage devices 125 of the storage system 120. Interaction between a server system 110 and the storage system 120 may enable the provision of storage services. That is, server system 110 may request the services of the storage system 120 (e.g., through read or write requests), and the storage system 120 may perform the requests and return responses for the services requested by the server system 110 (by exchanging packets over the connection system 150).

The server system 110 may issue access requests (e.g., read or write requests) by issuing packets using file-based access protocols, such as the CIFS (Common Internet File System) protocol or NFS (Network File System) protocol, over the TCP/IP (Transmission Control Protocol/Internet Protocol) when accessing data in the form of files and directories. Alternatively, the server system 110 may issue access requests by issuing packets using block-based access protocols, such as the FCP (Fibre Channel Protocol), or iSCSI (Internet Small Computer System Interface) SAN (Storage Area Network) access, when accessing data in the form of blocks.

The storage system 120 may comprise a computer system that stores data in a set of one or more storage devices 125. A storage device 125 may comprise a writable storage device media, such as disk devices, video tape, optical, DVD (digital versatile disk), magnetic tape, flash memory, MRAM (Magnetic Random Access Memory), PRAM (Phase Change RAM), and any other similar media adapted to store information (including data and parity information). In some embodiments, a storage device 125 comprises a disk device (described in detail below). In other embodiments, the storage device 125 may comprise any other type of storage device.

The storage system 120 may implement a file system to organize logically the data as a hierarchical structure of directories and files on the storage devices 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

Figure 2:
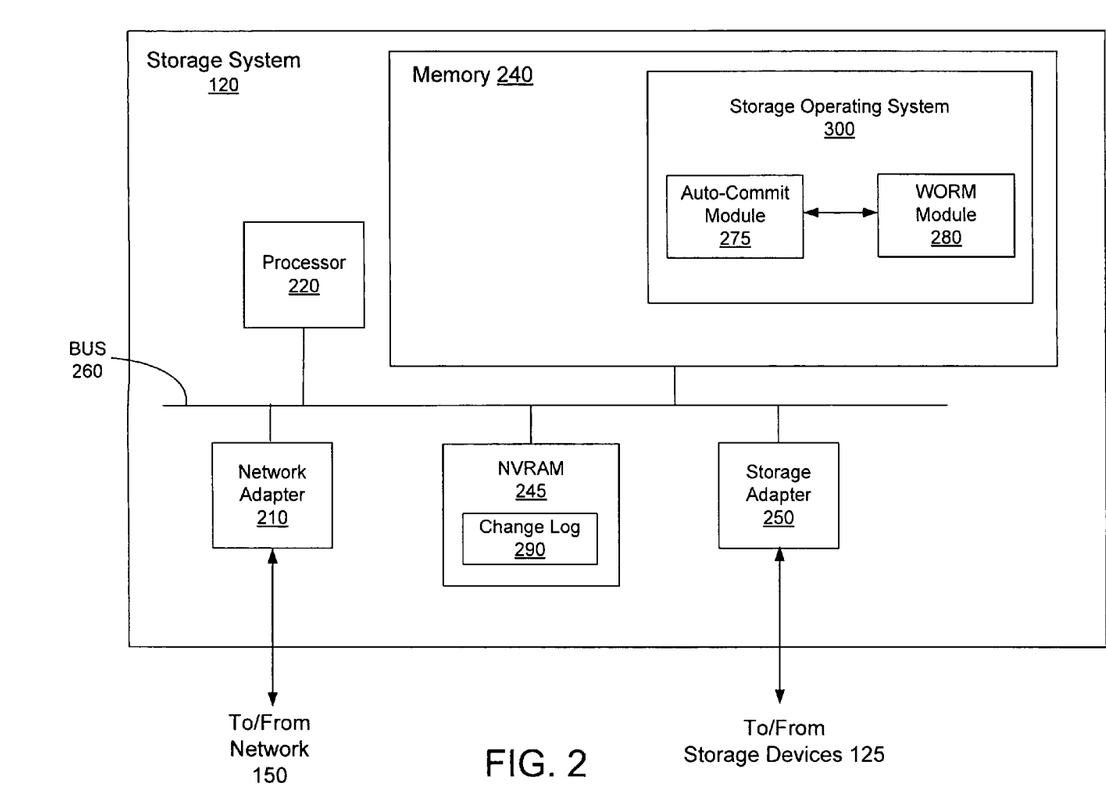
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 may be broadly, and alternatively, referred to as a computer system. Moreover, the teachings of the embodiments described herein may be adapted to a variety of storage system architectures including, but not limited to, a network-attached storage environment, a storage area network and disk assembly directly-attached to a server computer. The term "storage system" should, thus, be taken broadly to include such arrangements.

The storage system 120 comprises a network adapter 210, a processor 220, a memory 240, a NVRAM (non-volatile random access memory) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP (Internet Protocol) address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may include NVRAM 245 to be employed as a backup memory that ensures that the storage system 120 does not "lose" received information (e.g., CIFS and NFS requests) in the event of a system shutdown or other unforeseen problem. The NVRAM 245 is typically a large-volume solid-state memory array of RAM having either a back-up battery, or other built-in last-state-retention capabilities, that holds the last state of the memory in the event of any power loss to the array. Thus, even if an access request stored in memory 240 is lost or erased (e.g., due to a temporary power outage) the access request still may be recovered from the NVRAM 245. In other embodiments, in place of NVRAM 245, the storage system 120 may include any other type of non-volatile memory (such as flash memory, Magnetic Random Access Memory (MRAM), Phase Change RAM (PRAM), etc.).

The processor 220 executes a storage operating system application 300 of the storage system 120 that functionally organizes the storage system by, among other things, invoking storage operations in support of a file service implemented by the storage system. In some embodiments, the storage operating system 300 comprises a plurality of software layers (including an auto-commit module 275 and a WORM module 280) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a change log of file system activity 290 is stored in NVRAM 245. In other embodiments, the change log 290 is stored in memory 240. In still other embodiments, the change log 290 is stored on a storage device 125. As discussed below, in some embodiments, the auto-commit module 275 produces and uses the change log 290 to store a log of activity that changes the files of the storage system 120. The change log 290 may comprise change log entries of received write requests for various files (e.g., as received from a server system 110). The auto-commit module 275 may also use the change log 290 to determine if a file is to be made immutable.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, the storage adapter 250 may retrieve data. If necessary, the processor 220 (or the adapter 250) may process the data prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

In some embodiments, the storage system 120 may implement aggregates and flexible volumes (using, for example, FlexVol™ technology from NetApp, Inc. of Sunnyvale, Calif.) to manage data on the set of storage devices 125. An aggregate may comprise a total storage space provided by a set of one or more storage devices 125, the total storage space being allocated among a set of one or more flexible volumes.

An aggregate may provide a layer of abstraction between the physical storage devices and the flexible volumes so that a flexible volume is not directly tied to the physical storage devices on which it resides. As such, flexible volumes may be increased or decreased in storage size (within the total storage space of the aggregate) independently from the physical storage devices on which they reside.

The organization of a storage operating system 300 for the exemplary storage system 120 is now described briefly. However, it is expressly contemplated that the principles of the embodiments described herein may be implemented using a variety of alternative storage operating system architectures. As discussed above, the term "storage operating system" as used herein with respect to a storage system generally refers to the computer-executable code operable on a storage system that implements file system semantics (such as the above-referenced WAFL® or any other type of file system) and manages data access. In this sense, Data ONTAP® software is an example of such a storage operating system implemented as a microkernel. The storage operating system may also be implemented as an application program operating over a general-purpose operating system, such as UNIX® or Window®, or as a general-purpose operating system with configurable functionality.

In some embodiments, the auto-commit module 275 may be pre-included in storage operating system 300 software. In other embodiments, the auto-commit module 275 may comprise an external auxiliary plug-in type software module that works with the storage operating system 300 to enhance its functions. As such, the auto-commit module 275 may be imposed upon an existing storage operating system 300 to provide auto-commit functionality as described herein.

II. Components for Auto-Committing Files to Immutable Status Based on the Change Log of File System Activity Still referring to FIG. 2, the storage system 120 maintains a change log 290 of all the activity that changes the files of the storage system 120. The storage system 120 may maintain the change log 290 in the NVRAM 245. Alternatively, the storage system may maintain the change log 290 in the memory 240 or in a stable storage device 125. For example, the storage system 120 may maintain a relatively small change log in the NVRAM 245 and may maintain a relatively large change log in a storage device 125.

Upon receiving a write request for a particular specified file, the auto-commit module 275 may produce a change log entry (that represents the change to the particular file) in the change log 290. A write request may comprise a request for modifying the data and/or metadata of a specified file. When producing a change log entry for a specified file, the auto-commit module 275 may associate a timestamp with the change log entry. The timestamp may reflect the time of a predetermined event that relates to the modification of a file. For example, the timestamp may reflect the time that the write request was received, the time that the specified file was modified by the write request, or the time that the change log entry was produced. The timestamp of a change log entry may be used for various purposes as described below.

In some embodiments, the timestamp comprises an inode timestamp. An inode may comprise a data structure that contains information about a file. The inode may be created and maintained by the file system. Each file has an associated inode that is identified by an inode number (i-number) in the file system where it resides. Inodes provide information on files, such as user and group ownership, access mode (read, write, execute permissions), type, and the time the file was last modified (inode timestamp).

Each change log entry may contain a file identification of a file. The file identification may be any combination of the file name, a file pointer, the i-number of the inode, and/or the file's volume identification. The change log entry may also contain the timestamp (e.g., inode timestamp) and any other related inode information. For example, a change log entry may contain a file name only or an i-number with other inode information. In other embodiments, a change log entry does not contain the inode timestamp and the inode timestamp is retrieved from the inode using a pointer to the inode timestamp (e.g., the file identification). However, as discussed above with reference to the description of inodes, timestamps are not necessarily stored in the change log along with the change log entries. Some file system implementations may already store the last file modification time or the last inode change time in the file inode itself. In such implementations, the change log entry may contain, for example, just the filename, the file inode number and/or other information. The autocommit module can retrieve such information as needed from the inode.

In some embodiments, the auto-commit module 275 implements an auto-commit thread (which, in some embodiments, may include a process or any executable entity). The auto-commit thread may comprise a predetermined process of the auto-commit module 275 and the WORM module 280 that is executed by the processor 220. When invoked, the auto-commit thread processes the change log entries in the change log 290 to determine whether any files have met the auto-commit requirement. A file may meet the auto-commit requirement if, for the duration of the auto-commit time period, the file has not been modified.

For a file that the auto-commit module 275 determines has met its auto-commit requirement, the auto-commit module 275 sends notification to the WORM module 280. The WORM module 280 commits that file to immutable status (i.e., WORM status) and removes the change log entry for that file from the change log 290. In some embodiments, committing a file to immutable status involves setting the file to WORM status and setting a retention time for the file. The retention time is the time after which the file may be removed from immutable status. Retention time may be set using a secure system clock, which is a reliable internal reference time of the storage system 120. For example, the WORM module 280 may set the retention time for a file to last until 2015, and the system will protect the file from all modifications until 2015 based on the secure system clock. Once the retention time requirement has been met, the file may be modified (e.g., deleted).

The auto-commit thread then processes the next change log entry in the change log. As indicated above, the auto-commit module 275 may organize the change log entries for the various files from the oldest change log entry (having the oldest associated timestamp) to the newest change log entry (having the newest associated timestamp), e.g., by storing the oldest change log entry at the beginning of the change log and the newest change log entry at the end of the change log.

In some embodiments, the auto-commit module stores only one change log entry (the most recent change log) for each file in the change log. In these embodiments, when a new change log entry for a particular file is generated, the auto-commit module 275 may delete any prior change log entry for the particular file from the change log and store the new change log entry at the end of the change log (since it is the newest change log entry among the various files). As such, as the auto-commit module continues to receive write requests and generate change log entries for various files, the auto-commit module 275 also continues to manage and re-organize the change log to produce an ordering from the oldest change log entry to the newest change log entry for the various files, whereby only one change log entry is stored for each file.

In some embodiments, the auto-commit thread analyzes the change log beginning with the oldest change log entry to the newest change log entry to determine the time when a change log entry was generated and whether the auto-commit time period has elapsed since that time. In the some embodiments, once the auto-commit thread determines that a change log entry in the change log has not met the auto-commit time period, the auto-commit thread stops analyzing the change log entries in the change log and rests for a resting time period (i.e., the processor no longer executes the thread) until the auto-commit thread is invoked again. Since, as described above, the change log is ordered from the oldest change log entry to the newest change log entry, if an older change log entry in the change log has not yet met the auto-commit time period, it follows that the remaining newer change log entries in the change log also have not met the auto-commit time period. As such, processing of the remaining newer change log entries by the auto-commit thread is not needed.

The auto-commit module may invoke/activate the auto-commit thread again after a determined resting time period. In some embodiments, the resting time period is determined using the auto-commit time period and the time the oldest change log entry in the change log was generated. In some embodiments, the auto-commit thread rests for a resting time period that is approximately equivalent to the time it will take for the file associated with the oldest change log entry in the change log to meet its auto-commit requirement (referred to as the "remaining time to meet the auto-commit requirement"). For example, the file associated with the oldest change log entry may have five seconds left to meet the auto-commit requirement; during those fives seconds, the auto-commit thread may rest (i.e., the processor no longer executes the auto-commit thread) since there are no other files that will meet the auto-commit requirement within those five seconds. These rest durations may cumulatively add up to save a substantial amount of processing time and resources.

In some embodiments, the resting time period is determined by the auto-commit time period minus the remaining time to meet the auto-commit requirement. The remaining time to meet the auto-commit requirement may be determined by the current time (when the auto-commit thread is first set to rest) and the time the oldest change log entry was generated. In some embodiments, the resting time period may be represented by the following formula:

resting time period=auto-commit time period−(time when the auto-commit thread is set to rest−time the oldest change log entry was generated).

As new write requests for various files are received by the storage operating system 300, the auto-commit module 275 continues to manage and re-organize the change log and the auto-commit thread continues to analyze the change log entries to determine whether files have met the auto-commit requirement (and are thus to be set to immutable status).

Note that when a file is changed (e.g., written to), an inode timestamp of the change is set in the associated inode using the secure system clock. The auto-commit module 275 may automatically associate a change log entry with an inode timestamp. In some embodiments, by comparing (e.g., finding the difference between) the current secure system time and the inode timestamp, the auto-commit thread determines if a file has met its auto-commit requirement. The inode timestamp may indicate various predetermined events.

For example, the inode timestamp may indicate the time the file was last modified (referred to as "mtime"). The file system typically updates the mtime in the inode of the file each time the data of the file is modified. In other embodiments, the inode timestamp may indicate the time the file was last accessed (referred to as "atime"). The file system typically updates the atime in the inode of the file each time the file is accessed for a read or write operation. In other embodiments, the inode timestamp may indicate the time the metadata of the file was last modified (referred to as "ctime"). The file system typically updates the ctime in the inode of the file each time the metadata (e.g., permissions, ownership, link-counts, etc.) of the file is modified.

Figure 3:
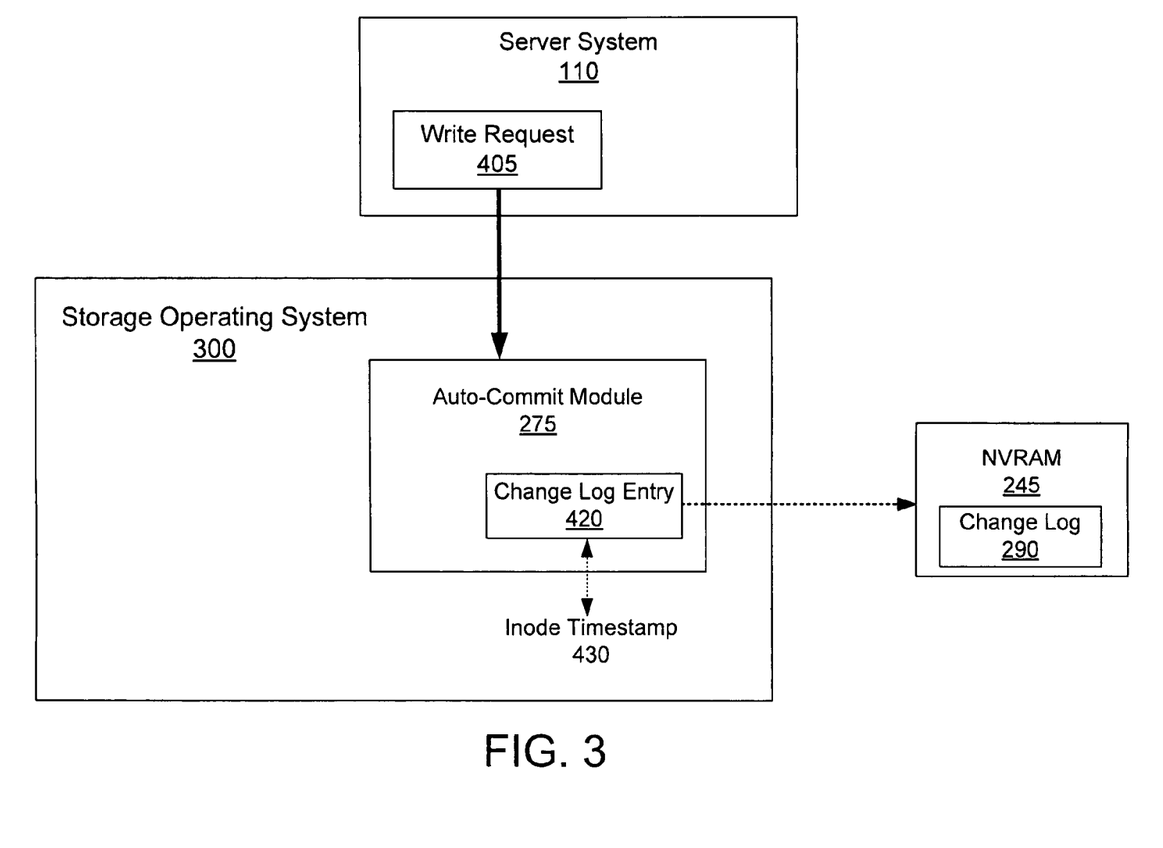
FIG. 3 is a conceptual diagram illustrating creation of a change log in accordance with some embodiments.

FIG. 3 is a conceptual diagram illustrating creation of a change log in accordance with some embodiments. In this example, the storage operating system 300 receives a write request 405 (e.g., received from an application executing on the server system 110). The write request 405 may include a request to change data and/or metadata associated with a specified file of the storage system 120. For each write request 405, the auto-commit module 275 generates a change log entry 420 that represents the change to the file of the storage system 120. For each received write request 405, the auto-commit module 275 stores a change log entry 420 in the change log 290 (e.g., as stored in NVRAM 245).

The auto-commit module 275 may associate an inode timestamp 430 with each change log entry 420. The auto-commit module 275 may do so by storing an inode timestamp 430 in each change log entry 420 or by storing a pointer to the inode timestamp 430 in each change log entry 420 (whereby the pointer may be used to retrieve the inode timestamp 430 for a change log entry 420). In some embodiments, the pointer may comprise a file identification of the file associated with the change log entry 420.

Figure 4A:
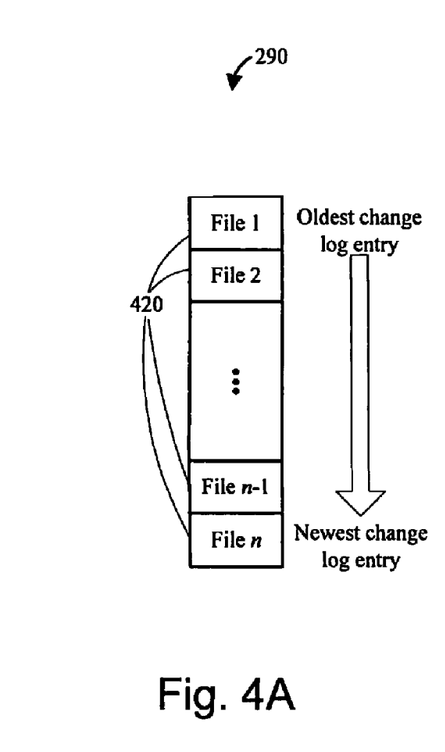
FIG. 4A is a conceptual diagram illustrating the organization of a change log in accordance with some embodiments.
Figure 4B:
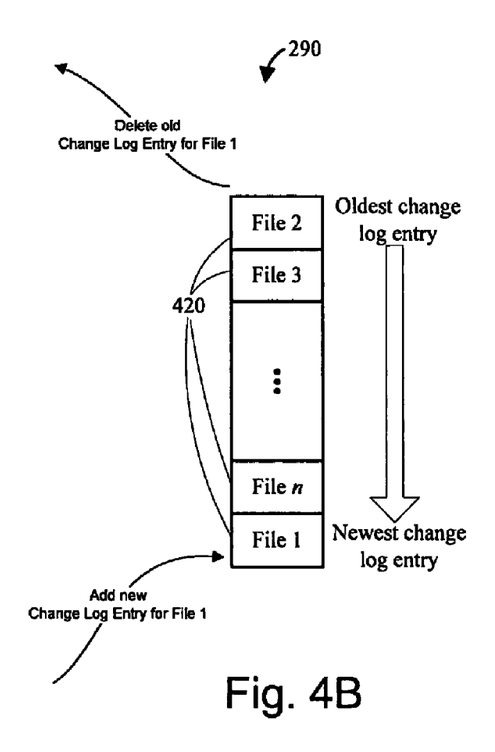
FIG. 4B is a conceptual diagram illustrating a change log when the storage system has changed a file in accordance with some embodiments.
Figure 4C:
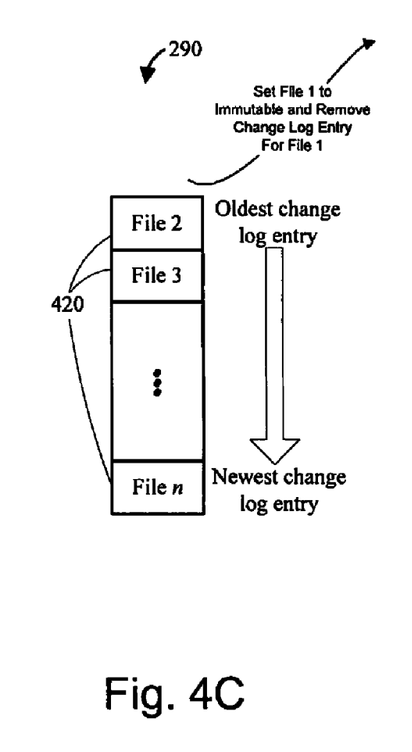
FIG. 4C is a conceptual diagram illustrating a change log when the storage system has set a file to immutable status in accordance with some embodiments.

FIGS. 4A-4C are conceptual diagrams illustrating the analysis of a change log in accordance with some embodiments. The change log 290 may comprise a table, file, or any other type of data structure for storing and organizing data.

FIG. 4A is a conceptual diagram illustrating the organization of a change log 290 in accordance with some embodiments. The auto-commit module 275 generates the change log 290, the change log 290 comprising a plurality of change log entries 420. The auto-commit module 275 also analyzes the change log 290 to determine if a file is to be set to immutable status by implementing an auto-commit thread. To facilitate this analysis, as indicated in FIG. 4A, change log entries 420 are organized in the change log 290 from the oldest change log entry to the newest change log entry (e.g., by storing the oldest change log entry at the beginning of the change log 290 and the newest change log entry at the end of the change log 290). Each change log entry 420 is associated with a change to a particular file (e.g., File 1, File 2, File n, etc.) of the storage system 120.

For example, as shown in FIG. 4A, the change log entry 420 for File 1 is older than the change log entry for File 2 (i.e., the change log entry 420 for File 1 was generated before the change log entry for File 2). In this example, the change log entry for File 1 is the oldest and is stored at the beginning of the change log 290, and thereby is processed first by the auto-commit thread. The change log entry for File 2 is the second oldest and is stored second in the change log 290, and thereby is processed second by the auto-commit thread, and so forth. The change log entry for File n is the newest and is stored at the end of the change log 290 (where n is an integer), and thereby is processed last by the auto-commit thread.

FIG. 4B is a conceptual diagram illustrating the change log 290 of FIG. 4A when a new change log entry 420 for File 1 is generated. In this example, the server system 110 has issued a new write request 405 to File 1 and the auto-commit module 275 has generated a new change log entry 420 for the new write request 405. In some embodiments, the auto-commit module 275 stores only one change log entry 420 (the most recent change log entry) for each file in the change log 290. In these embodiments, when a new change log entry 420 for a particular file is generated, the auto-commit module 275 may delete any prior change log entry 420 for the particular file from the change log 290 and store the new change log entry 420 at the end of the change log (since the new change log entry is the newest change log entry among the various files).

In the example of FIG. 4B, the old change log entry 420 for File 1 is deleted. The new change log entry 420 for File 1 is added to the end of the change log 290. The change log entry 420 for File 2 automatically becomes the oldest change log entry and is then at the beginning of the change log 290. As such, as the auto-commit module 275 continues to receive write requests and generate change log entries 420 for various files, the auto-commit module 275 also continues to manage and re-organize the change log 290 to produce an ordering from the oldest change log entry to the newest change log entry for the various files, whereby only one change log entry 420 is stored for each file.

In some embodiments, a change log entry 420 is not removed when a file is modified. Consider, for example, a File A is modified; the change log entry for File A goes to the change log. Then, a File B is modified; the change log entry for File B goes to the change log 290. Then, again, File A is modified. Now, instead of removing the very first change log entry for File A and appending that change log entry to the end of the change log 290 with the recent timestamp, the change log 290 may keep the change log entries ordered as (A, B, A). An advantage here is that every time a change log entry 420 is added, the system does not need to rescan the entire change log 290 to check if the file already exists in the change log 290. A possible downside is that more work will have to take place during auto-commit processing; when the system reads an entry in the change log 290, the system will have to revalidate the file's most recent timestamp from the inode (which will anyway maintain the modified time). So, based on the timestamp stored in the inode, the auto-commit module 275 will make the decision on whether to rest, to invoke the WORM module 280 or to do whatever.

FIG. 4C is a conceptual diagram illustrating the change log 290 of FIG. 4A when File 1 is determined to have met the auto-commit requirement and is set to immutable status in accordance with some embodiments. While the auto-commit module 275 continues to manage and re-organize the change log 290, the auto-commit module 275 also analyzes the change log 290 to determine whether a file has met its auto-commit requirement (i.e., for the duration of the auto-commit time period, the file has not been modified). The auto-commit module 275 may do so by implementing an auto-commit thread. In the some embodiments, the auto-commit thread analyzes the change log beginning with the oldest change log entry to the newest change log entry to determine the time when a change log entry 420 was generated and whether the auto-commit time period has elapsed since that time. The auto-commit thread may do so analyzing the inode timestamp associated with the change log entry. If a pointer to the associated inode timestamp is stored in the change log entry, the auto-commit thread uses the pointer to retrieve and analyze the inode timestamp. If the associated inode timestamp is stored in the change log entry, the auto-commit thread does not need to retrieve the inode timestamp.

In the example of FIG. 4C, the auto-commit thread has determined that change log entry 420 for File 1 has met its auto-commit requirement. Accordingly, the auto-commit module 275 invokes the WORM module 280. The WORM module 280 commits File 1 to immutable status (i.e., WORM status) and the auto-commit thread removes the change log entry 420 for File 1 from the change log 290. The auto-commit thread may continue to cycle through the operations described above to continually update the change log 290 as files are changed (e.g., as the storage operating system 300 receives write requests 405) and as files are set to immutable status.

Once the auto-commit thread determines that a change log entry 420 in the change log has not met the auto-commit time period, the auto-commit thread stops analyzing the change log entries 420 in the change log 290 and rests. Since, as described above, the change log 290 is ordered from the oldest change log entry to the newest change log entry, if an older change log entry in the change log 290 has not yet met the auto-commit time period, it follows that the remaining newer change log entries in the change log 290 also have not met the auto-commit time period. As such, processing of the remaining newer change log entries by the auto-commit thread is not needed and would unnecessarily expend system resources. The auto-commit module 275 may invoke/activate the auto-commit thread again after a determined resting time period. In some embodiments, as described above, the resting time period is determined using the auto-commit time period and the time the oldest change log entry in the change log 290 was generated.

Figure 5:
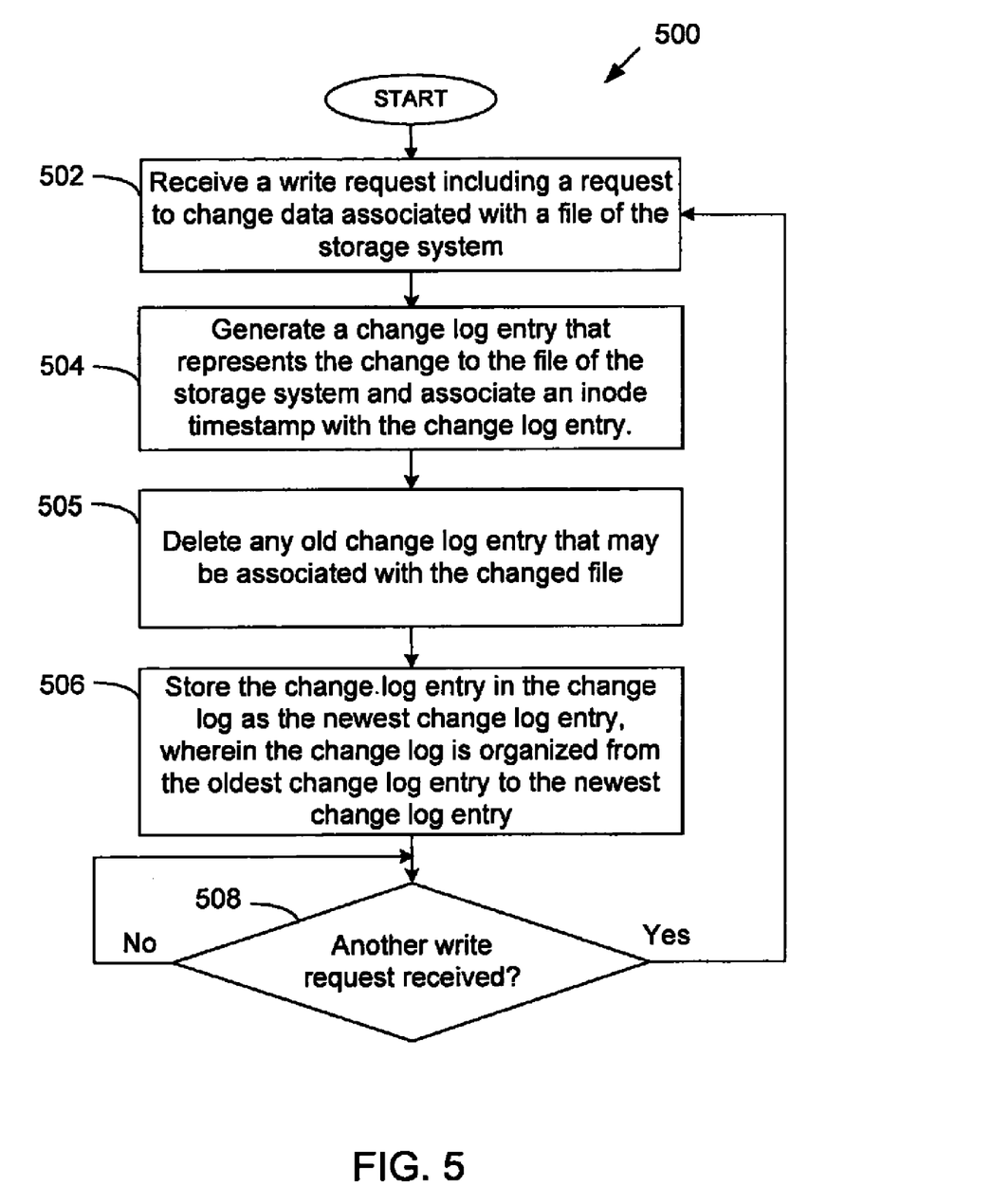
FIG. 5 is a flowchart of a method of creating a change log based on file system activity in accordance with some embodiments.

III. Method for Auto-Committing Files to Immutable Status Based on the Change Log of File System Activity FIG. 5 is a flowchart of a method 500 of creating a change log based on file system activity in accordance with some embodiments. The method 500 may be carried out by components of the storage system 120, which is discussed above with reference to FIGS. 2-4C. In some embodiments, the method 500 is performed by the auto-commit module 275. In some embodiments, some of the steps of the method 500 are implemented by software or hardware. The order and number of steps of the method 500 are for illustrative purposes only and, in other embodiments, a different order and/or number of steps are used.

The method 500 starts at step 502 where it receives a write request including a request to change data associated with a particular file of the storage system. At step 504, the method 500 generates a change log entry that represents the change to the particular file of the storage system and associates an inode timestamp with the change log entry. At step 505, the method 500 deletes any old/prior change log entry that may be associated with the particular changed file. Next, in step 506, the method 500 stores the generated change log entry in the change log, which is organized from the oldest change log entry to the newest change log entry. In some embodiments, the method 500 stores the generated change log entry at the end of the change log.

The method 500 proceeds to decision operation 508 where it determines if another write request is received. If a write request is received, the method 500 returns to step 502. However, if a write request is not received, the method 500 continues at step 508 where it continues to determine if another write request is received.

Figure 6:
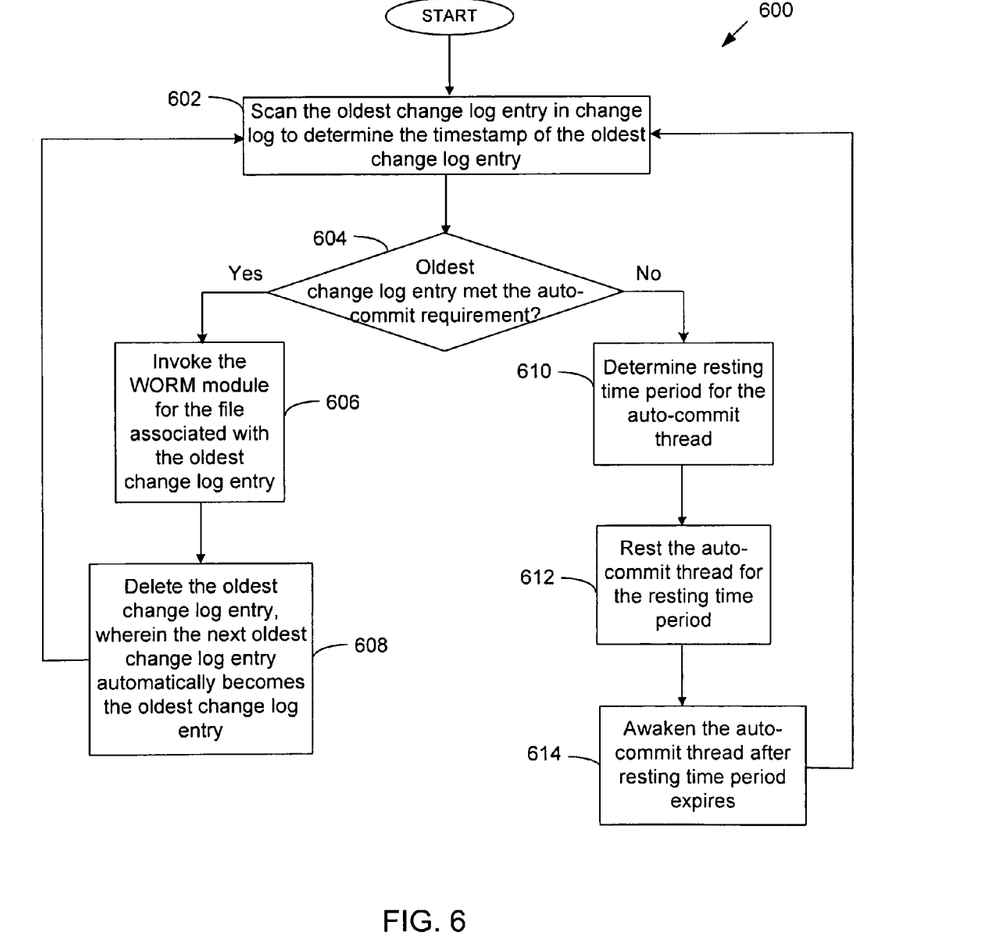
FIG. 6 is a flowchart of a method of auto-committing files to immutable status based on a change log of file system activity in accordance with some embodiments.

FIG. 6 is a flowchart of a method 600 of auto-committing files to immutable status based on a change log of file system activity in accordance with some embodiments. The method 600 may be carried out by components of the storage system 120, which are discussed above with reference to FIGS. 2-4C. In some embodiments, the method 600 is performed by the auto-commit thread. In some embodiments, some of the steps of the method 600 are implemented by software or hardware. The order and number of steps of the method 600 are for illustrative purposes only and, in other embodiments, a different order and/or number of steps are used.

The method 600 starts at step 602 when the method 600 scans/analyzes the oldest change log entry to determine the timestamp of the oldest change log entry. For example, the timestamp may be determined by retrieving the timestamp from the inode of the file associated with the oldest change log entry or by retrieving the timestamp from the oldest change log entry itself (if the change log entries are configured to store the timestamps). The method then determines (at step 604) whether the oldest change log entry has met the auto-commit requirement (e.g., by comparing the current time with the timestamp). The timestamp may comprise an inode timestamp based on mtime, atime or ctime, as discussed above.

If the oldest change log entry has met the auto-commit requirement (at step 604—Yes), then the method 600 invokes (at step 606) the WORM module for the file associated with the oldest change log entry, whereby the WORM module sets the associated file to immutable/WORM status. In step 608, the method 600 then deletes the oldest change log entry from the change log, whereby the next oldest change log entry in the change log automatically becomes the oldest change log entry. The method then returns to step 602.

If the oldest change log entry has not met the auto-commit requirement (at step 604—No), the method 600 determines (at step 610) a resting time period for the auto-commit thread and rests (at step 612) the auto-commit thread for the resting time period. After the resting time period expires, the method awakens (at step 614) the auto-commit thread for the auto-commit thread to continue processing the change log entries of the change log. The method then returns to step 602.

IV. Computer Readable Medium Implementation

Some embodiments may be conveniently implemented using a conventional general purpose or a specialized digital computer or microprocessor programmed according to the teachings of the present disclosure, as will be apparent to those skilled in the computer art. Appropriate software coding may readily be prepared by skilled programmers based on the teachings of the present disclosure, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product which is a storage medium (media) having instructions stored thereon/in which may be used to control, or cause, a computer to perform any of the processes of an embodiment. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some embodiments include software for controlling both the hardware of the general purpose/specialized computer or microprocessor, and for enabling the computer or microprocessor to interact with a human user or other mechanism utilizing the results of an embodiment. Such software may include without limitation device drivers, operating systems, and user applications. Ultimately, such computer readable media further includes software for performing some embodiments, as described above.

Included in the programming (software) of the general/specialized computer or microprocessor are software modules for implementing the teachings of some embodiments, including without limitation receiving a write request including a request to change data associated with a file of a storage system, generating a change log entry that represents the change to the file of the storage system, deleting any old change log entry that may be associated with a changed file, storing the change log entry into the change log as a newest change log entry, scanning an oldest change log entry in the change log to determine a time to invoke an auto-commit thread, resting the auto-commit thread until the time to invoke the auto-commit thread arrives, and invoking the auto-commit thread when the time to invoke the auto-commit thread arrives, according to processes of some embodiments.

While the embodiments described herein have been described with reference to numerous specific details, one of ordinary skill in the art will recognize that the embodiments may be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A storage system for storing a plurality of files and auto-committing one or more files to immutable status, the storage system comprising:
a storage operating system configured for:
receiving a plurality of write requests, each write request comprising a requested modification of a file of the storage system;
for each received write request, generating a change log entry for a file representing the write request for the file, the change log entry having an associated timestamp relating to when the file is modified, wherein a first change log entry having a first timestamp is generated for a first write request for a first file and a second change log entry having a second timestamp is generated for a second write request for a second file;
storing each change log entry in a change log, wherein the first and second change log entries are stored to the change log;
processing the change log entries in the change log for determining whether to commit a plurality of different files to immutable status beginning from the oldest change log entry having the oldest timestamp to the newest change log entry having the newest timestamp for determining if any files have met an auto-commit requirement, wherein a file meets the auto-commit requirement when the file has not been modified for the duration of a predetermined auto-commit time period, wherein the first file is determined to meet the auto-commit requirement based on the first timestamp in the first change log entry and the second file is determined to meet the auto-commit requirement based on the second timestamp in the second change log entry; and
committing any files that have met the auto-commit requirement to immutable status, wherein the first file and the second file are committed to immutable status.

2. The storage system of claim 1, wherein the change log entries are organized in the change log from the oldest change log entry having the oldest timestamp to the newest change log entry having the newest timestamp.

3. The storage system of claim 1, wherein processing a change log entry comprises comparing the current time to the associated timestamp to determine if the file of the change log entry has met the auto-commit requirement.

4. The storage system of claim 1, wherein the storage operating system is further configured for storing, in the change log, only the most recent change log entry for each file and deleting any prior change log entries for each file.

5. The storage system of claim 1, wherein the timestamp associated with a change log entry for a file indicates when the write request for the file was received, when the file was modified by the write request, or when the change log entry was generated.

6. The storage system of claim 1, wherein the storage operating system is further configured for:
deleting change log entries in the change log for any files that have met the auto-commit requirement and have been set to immutable status.

7. A method for auto-committing one or more files of a storage system to immutable status, the method comprising:
receiving a plurality of write requests, each write request comprising a requested modification of a file of the storage system;
for each received write request, generating a change log entry for a file representing the write request for the file, the change log entry having an associated timestamp relating to when the file is modified, wherein a first change log entry having a first timestamp is generated for a first write request for a first file and a second change log entry having a second timestamp is generated for a second write request for a second file;
storing each change log entry in a change log, wherein the first and second change log entries are stored to the change log;
processing the change log entries in the change log for determining whether to commit a plurality of different files to immutable status beginning from the oldest change log entry having the oldest timestamp to the newest change log entry having the newest timestamp for determining if any files have met an auto-commit requirement, wherein a file meets the auto-commit requirement when the file has not been modified for the duration of a predetermined auto-commit time period, wherein the first file is determined to meet the auto-commit requirement based on the first timestamp in the first change log entry and the second file is determined to meet the auto-commit requirement based on the second timestamp in the second change log entry; and
committing any files that have met the auto-commit requirement to immutable status, wherein the first file and the second file are committed to immutable status.

8. The method of claim 7, wherein processing a change log entry comprises comparing the current time to the associated timestamp to determine if the file of the change log entry has met the auto-commit requirement.

9. The method of claim 7, wherein storing each change log entry in the change log comprises storing only the most recent change log entry for each file and deleting any prior change log entries for each file.

10. The method of claim 7, wherein the timestamp associated with a change log entry for a file indicates when the write request for the file was received, when the file was modified by the write request, or when the change log entry was generated.

11. The method of claim 7, further comprising:
deleting change log entries in the change log for any files that have met the auto-commit requirement and have been set to immutable status.

12. A storage system for storing a plurality of files and auto-committing one or more files to immutable status, the storage system comprising:
a storage operating system configured for:
receiving a plurality of write requests, each write request comprising a requested modification of a file of the storage system;
for each received write request, generating a change log entry for a file representing the write request for the file, the change log entry having an associated timestamp indicating when the file is modified, wherein a first change log entry having a first timestamp is generated for a first write request for a first file and a second change log entry having a second timestamp is generated for a second write request for a second file;
storing each change log entry in a change log, wherein the first and second change log entries are stored to the change log;
processing the change log entries in the change log for determining whether to commit a plurality of different files to immutable status beginning from the oldest change log entry having the oldest timestamp to the newest change log entry having the newest timestamp for determining if any files have met an auto-commit requirement, wherein a file meets the auto-commit requirement when the file has not been modified for the duration of a predetermined auto-commit time period, wherein the first file is determined to meet the auto-commit requirement based on the first timestamp in the first change log entry and the second file is determined to meet the auto-commit requirement based on the second timestamp in the second change log entry;
upon determining that a file of a change log entry has not met the auto-commit requirement, stopping processing of the change log entries for a determined resting time period; and
beginning processing of the change log entries after expiration of the resting time period, the processing of the change log entries beginning from the oldest change log entry to the newest change log entry.

13. The storage system of claim 12, wherein the storage operating system is further configured for:
upon determining that a file of a change log entry has met the auto-commit requirement, setting the file to immutable status, wherein the first file and the second file are committed to immutable status.

14. The storage system of claim 12, wherein the timestamp associated with a change log entry for a file indicates when the write request for the file was received, when the file was modified by the write request, or when the change log entry was generated.

15. A method for auto-committing one or more files of a storage system to immutable status, the method comprising:
receiving a plurality of write requests, each write request comprising a requested modification of a file of the storage system;
for each received write request, generating a change log entry for a file representing the write request for the file, the change log entry having an associated timestamp indicating when the file is modified, wherein a first change log entry having a first timestamp is generated for a first write request for a first file and a second change log entry having a second timestamp is generated for a second write request for a second file;
storing each change log entry in a change log, wherein the first and second change log entries are stored to the change log;
processing the change log entries in the change log for determining whether to commit a plurality of different files to immutable status beginning from the oldest change log entry having the oldest timestamp to the newest change log entry having the newest timestamp for determining if any files have met an auto-commit requirement, wherein a file meets the auto-commit requirement when the file has not been modified for the duration of a predetermined auto-commit time period, wherein the first file is determined to meet the auto-commit requirement based on the first timestamp in the first change log entry and the second file is determined to meet the auto-commit requirement based on the second timestamp in the second change log entry;
upon determining that a file of a change log entry has not met the auto-commit requirement, stopping processing of the change log entries for a determined resting time period; and
beginning processing of the change log entries after expiration of the resting time period, the processing of the change log entries beginning from the oldest change log entry to the newest change log entry.

16. The method of claim 15, further comprising:
upon determining that a file of a change log entry has met the auto-commit requirement, setting the file to immutable status, wherein the first file and the second file are committed to immutable status.

17. The method of claim 15, wherein the timestamp associated with a change log entry for a file indicates when the write request for the file was received, when the file was modified by the write request, or when the change log entry was generated.

18. The storage system of claim 1, wherein the change log, first file, and the second file are stored in different storage locations.

19. The storage system of claim 1, wherein:
the first timestamp in the first change log entry is older than the second timestamp in the second change log entry; and
processing the change log entries in the change log comprises processing the first change log entry before processing the second change log entry by determining that the first file meets the auto-commit requirement based on the first timestamp in the first change log entry before determining that the second file meets the auto-commit requirement based on the second timestamp in the second change log entry.

20. The method of claim 7, wherein the change log, first file, and the second file are stored in different storage locations.

21. The method of claim 7, wherein:
the first timestamp in the first change log entry is older than the second timestamp in the second change log entry; and
processing the change log entries in the change log comprises processing the first change log entry before processing the second change log entry by determining that the first file meets the auto-commit requirement based on the first timestamp in the first change log entry before determining that the second file meets the auto-commit requirement based on the second timestamp in the second change log entry.

22. The storage system of claim 12, wherein the change log, first file, and the second file are stored in different storage locations.

23. The storage system of claim 12, wherein:

the first timestamp in the first change log entry is older than the second timestamp in the second change log entry; and processing the change log entries in the change log comprises processing the first change log entry before processing the second change log entry by determining that the first file meets the auto-commit requirement based on the first timestamp in the first change log entry before determining that the second file meets the auto-commit requirement based on the second timestamp in the second change log entry.

24. The method of claim 15, wherein the change log, first file, and the second file are stored in different storage locations.

25. The method of claim 15, wherein:

the first timestamp in the first change log entry is older than the second timestamp in the second change log entry; and processing the change log entries in the change log comprises processing the first change log entry before processing the second change log entry by determining that the first file meets the auto-commit requirement based on the first timestamp in the first change log entry before determining that the second file meets the auto-commit requirement based on the second timestamp in the second change log entry.

* * * * *